INVENTORS
JAN FREDERIK SCHOUTEN
JOHANNES ANTON GREEFKES
FRANK DE JAGER
BY [signature]
AGENT Dec. 8, 1953 J. F. SCHOUTEN ET AL 2,662,118

PULSE MODULATION SYSTEM FOR TRANSMITTING THE CHANGE IN THE APPLIED WAVE-FORM

Filed Feb. 10, 1949

7 Sheets-Sheet 2

INVENTORS
JAN FREDERIK SCHOUTEN
JOHANNES ANTON GREEFKES
FRANK DE JAGER
BY [signature]
AGENT

INVENTORS
FRANK DE JAGER
JAN FREDERIK SCHOUTEN
JOHANNES ANTON GREEFKES
BY AGENT

INVENTORS
JAN FREDERIK SCHOUTEN
JOHANNES ANTON GREEFKES
FRANK DE JAGER
BY [signature]
AGENT

INVENTORS
JAN FREDERIK SCHOUTEN
JOHANNES ANTON GREEFKES
FRANK DE JAGER

BY [signature]

AGENT

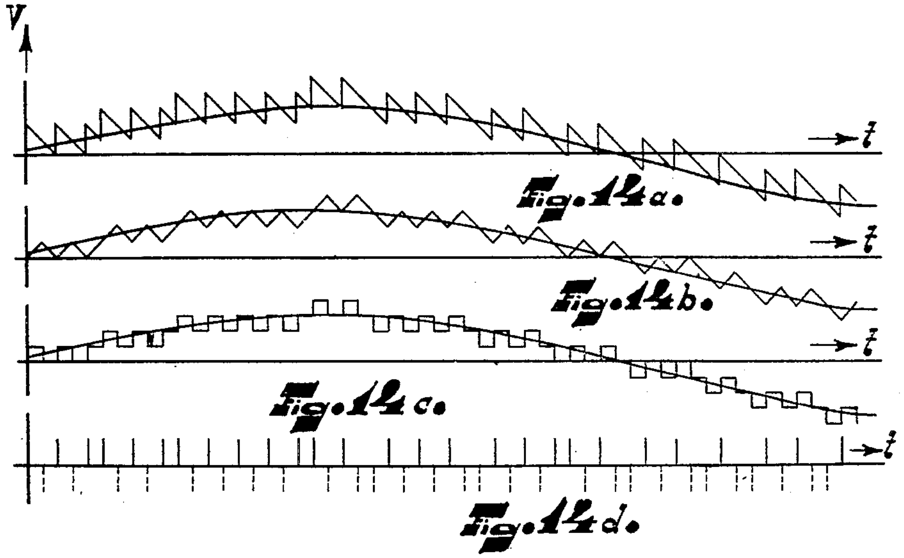
Fig. 14a. Fig. 14b. Fig. 14c.
Fig. 14d.
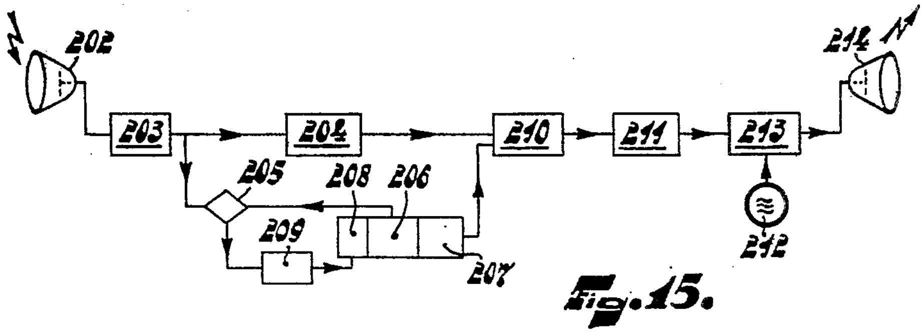
Fig. 15.
INVENTORS
JAN FREDERIK SCHOUTEN
JOHANNES ANTON GREEFKES
FRANK DE JAGER
BY [signature]
AGENT Dec. 8, 1953 J. F. SCHOUTEN ET AL 2,662,118

PULSE MODULATION SYSTEM FOR TRANSMITTING THE CHANGE IN THE APPLIED WAVE-FORM

Filed Feb. 10, 1949

7 Sheets-Sheet 7

INVENTORS
JAN FREDERIK SCHOUTEN
JOHANNES ANTON GREEFKES
FRANK DE JAGER

BY [signature]

AGENT

Patented Dec. 8, 1953

2,662,118

UNITED STATES PATENT OFFICE 2,662,118

PULSE MODULATION SYSTEM FOR TRANSMITTING THE CHANGE IN THE APPLIED WAVE-FORM

Jan Frederik Schouten, Frank de Jager, and Johannes Anton Greefkes, Eindhoven, Netherlands, assignors to Hartford National Bank and Trust Company, Hartford, Conn., as trustee Application February 10, 1949, Serial No. 75,664

Claims priority, application Netherlands May 22, 1948

13 Claims. (Cl. 179—15.6)

This invention relates to a system for transmitting intelligence signals by way of pulse-modulation and transmitters and receivers adapted to use in such a system. The invention concerns more particularly the transmission of signals varying arbitrarily in amplitude and frequency within certain limits, such as, for example, speech, music or television signals, in contradistinction to signals not arbitrarily varying in amplitude and frequency such as, for instance Morse signals, though the latter might also be transmitted with the use of the invention.

Various systems of pulse modulation are known for transmitting, by way of radio- or light-waves, speech oscillations and the like by means of pulse-shaped signals.

Nowadays the most used is pulsephase-modulation in which the pulses transmitted may be imagined to be initiated, starting from a series of equidistant pulses of constant amplitude and duration by shifting the equidistant pulses over a time interval, of which the sign and value preferably characterize the instantaneous values of the signal to be transmitted which are present at equidistant instants.

For demodulation of pulsephase-modulation it has already been proposed to lead the incoming, phase-modulated pulses through a network having a time constant which corresponds substantially to or exceeds one cycle of one of the lower intelligence signal frequencies and of which, at a constant input voltage, the output voltage within the frequency range of the signals to be reproduced, decreases, for instance linearly or quadratically, with the frequency. Such a network which may, for instance, consist of a series-resistance and a cross-condenser, behaves as an integrating network in regard to the signal frequencies to be reproduced and at the output terminals of this network the desired signals appear which are supplied to a loudspeaker, for instance after amplification. Hereinafter the expression "signal frequencies integrating network" is to be understood to mean inter alia a network of this type.

In transmitting signals by way of pulsephase-modulation, interferences manifesting themselves as noise at the receiver end, can be reduced by causing the incoming distorted pulses, to start a pulse-regenerator through a threshold device or a slicer, which pulse-regenerator, on reception of each impulse, supplies a "renewed" pulse of which only the instant of occurrence but not the form and amplitude depend upon the incoming pulse.

Due to interferences, however, the instant of response of the pulse-regenerator (also called "pulse repeater") fluctuates arbitrarily, at the receiver end, about the desired instant of response given by the transmitted signal itself, whereby noise, which cannot be eliminated at the receiver end, is introduced into the incoming signal.

Another known system of pulse-modulation is pulse-frequency-modulation, in which the recurrence frequency of a sequence of pulses is varied in accordance with the instantaneous value of a signal to be transmitted. In pulse-phase-modulation the signal to be transmitted is preferably scanned (so-called "probing") at equidistant instants, but this is not the case in pulsefrequency-modulation.

In pulsefrequency-modulation, also, a pulse-regenerator may be used for noise-suppression at the receiver end, but no more than in pulse-phase-modulation can the instant of appearance of the incoming pulses be corrected, so that a noise component which cannot be eliminated again occurs in the incoming signal and, moreover, the frequency-band required for transmitting signals is comparatively large, much the same as in normal frequency-modulation.

In pulsefrequency-modulation the incoming (renewed pulses) are adapted to be supplied to the reproducing device through a low-pass filter suppressing the pulse-recurrence-frequency. The time-constant of such a network consisting, for instance, of a series-resistance and a cross-condenser should be smaller than one cycle of the highest signal-frequency to be reproduced and exceed one cycle of the lowest pulse-recurrence-frequency occurring, and the attenuation of the network should be constant within the frequency-range of the signal-frequencies to be reproduced. Such a network is not a signal-frequencies integrating network.

Another known system of pulse-modulation is pulsecode-modulation. In the aforesaid systems of pulse-modulation any instantaneous value of the signal lying within given limits but otherwise being arbitrary, can be transmitted, but in pulsecode-modulation only a limited number of amplitude levels can be transmitted, for instance 32 and 128 with the use of the so-called five- or seven-unit code respectively.

In this system, just as in pulsephase-modulation, the signal to be transmitted is probed at equidistant instants, but instead of the instantaneous values of the signal, which occur at these equidistant moments, the nearest of the 32 or 128 transmissible amplitude levels is in every instance transmitted in a particular manner, since the level to be transmitted is coded i. e. that with the use of the five unit code a group of pulses characterizing this level and composed of maximally five equal and equidistant pulses is produced and transmitted. The presence or absence of one or more pulses of a group characterizes the amplitude-level and consequently approximately the instantaneous value of the signal. The groups of pulses transmitted are equidistant and exhibit a recurrence-frequency exceeding the highest signal-frequency to be transmitted.

In pulsecode-modulation systems, in which, like in other systems of pulse-modulation, at the receiver end pulse-regenerators may be used, the incoming groups of pulses are required to be decoded. Since now the pulses should occur only at definite relative time intervals, any transmission errors introduced by shifts in time of the incoming pulses can fundamentally be eliminated to a high degree, in contradistinction to the aforesaid systems of pulse-modulation. This may be utilized to advantage in transmitting pulse-code-modulation through several relay-transmitters.

Since in pulsecode-modulation only a limited number of amplitude levels is used the image transmitted of the signal to be transmitted is not exact but only approximative. This causes a certain "coding noise" or "quantising noise," but with the use of the five-unit code at a recurrence-frequency of the pulse groups of 8000 c./s. this is tolerable in practice and small in using the seven-unit code with the same recurrence-frequency. However, the technical difficulties of the (de) coding arrangements, serious as they are, considerably increase with the number of units of the code.

In pulse-phase- and pulsecode-modulation the recurrence-frequency of the pulses and pulse groups respectively should exceed the highest signal-frequency to be transmitted. A grade of reproduction suitable for telephony purposes is attained if this recurrence-frequency is approximately 2.5 times as high as the highest signal-frequency to be transmitted. In conventional systems the recurrence-frequency is 8000 cycles/sec. or 9000 cycles/sec. for a maximum signal-frequency of 3400 cycles/sec.

In television transmission, in which a much greater frequency - range (for instance 15 cycles/sec. to $5.10^6$ c./s.) must be transmitted, a smaller ratio between pulse-recurrence-frequency and maximum signal-frequency is usually sufficient.

In pulsefrequency-modulation the minimally occurring pulse-recurrence-frequency must satisfy the said condition.

Transmission methods, in which the signals to be transmitted are probed at equidistant instants, as for instance in pulsephase-modulation and pulsecode-modulation, are suitable for use in so-called multiplex systems with time division, in which values characterizing different intelligence signals are periodically transmitted in succession. Pulse-frequency-modulation does not lend itself thereto.

The invention breaks with the established technique usual in pulse-modulation for transmitting voice oscillations and the like, to characterize in every instance the instantaneous value of the signal to be transmitted by frequency- or phase-deviations or with the use of a special pulse-group code.

In a system or transmitter for transmitting, by way of pulse-modulation intelligence signals to be received by means of a main receiver, the transmitter, according to the invention, comprises a pulse-sender with a pulse generator and the pulse-shaped signals derived therefrom control an auxiliary receiver with a signal-frequencies integrating network, of which the output voltage varies by a finite amount whenever a pulse-shaped signal is received, the pulse-sender being controlled by a difference voltage obtained by difference-production of the intelligence signal to be transmitted and the output voltage of the auxiliary receiver, in such manner that the pulse-shaped signals which are supplied to the auxiliary receiver while the instantaneous value of the intelligence signal to be transmitted is substantially invariable with respect to time, bring about in every instance a reversal in polarity of the difference voltage.

The pulse-sender preferably comprises a pulse-generator for producing equidistant pulses with a recurrence-frequency which, in telephony transmission, is approximately five times as high as the highest signal-frequency to be transmitted, and only pulses coinciding with pulses of a train of equidistant pulse-shape are transmitted. This measure permits, like in pulsecode-modulation, any shifts in time of the incoming pulses caused by interferences and consequently noise otherwise caused in the present system to be considerably reduced at the receiver end, whilst dispensing with the (de) coding devices which are required and technically objectionable in pulsecode-modulation.

The last-mentioned new system of pulse-modulation, in which only pulses coinciding with a sequence of equidistant pulse-shaped signals are transmitted, will hereinafter be called "delta-pulsecode-modulation" so as to distinguish it from other pulse-modulation systems. In a transmitter for this system of pulse-modulation, in effect, only a pulse-shaped signal is transmitted at equidistant instants, which characterizes the difference ("delta") between the instantaneous values of intelligence signal and output voltage of the auxiliary receiver, which pulse-shaped signal is in the first instance independent of the absolute value or polarity of the instantaneous value of the intelligence signal and the corresponding auxiliary-receiver output-voltage. The instantaneous value of the said difference is only indicated by the transmission i. e. that not any arbitrary instantaneous value of the difference can be transmitted, in analogy to the limited number of transmissible amplitude levels in pulse-code-modulation. In the system according to the invention it is sufficient to indicate the positive and negative polarity of the instantaneous value of the difference voltage or even to indicate either the positive or the negative polarity of the difference voltage, entirely independently of the value of this difference voltage.

In this manner the transmission of the pulse-shaped signals, in a system or transmitter according to the invention, can be made to depend upon the polarity of the difference voltage. In deltapulse-code-modulation, for instance, pulses of positive polarity can be transmitted with a positive difference voltage, and pulses of a negative polarity with a negative difference voltage, or again pulses, for instance, of positive polarity can be transmitted only with, for instance, positive difference voltage. In the last-mentioned case the presence of a negative difference voltage at the main receiver and the auxiliary receiver is brought out by the absence of definite pulses from a sequence of equidistant pulses. If desired, the absent negative pulses may be added to the incoming positive pulses in the main receiver and the auxiliary receiver.

Of course, the main receiver and the auxiliary receiver should substantially correspond to one another in the present system. Similarly to the auxiliary receiver, the main receiver should comprise a signal-frequencies integrating network, of which the output voltage varies by a finite amount whenever receiving a pulse-shaped signal, starting from the then prevailing instantaneous value of the output voltage. A signal-frequencies integrating network has a favourable influence on the signal-to-noise ratio perceptible by the ear, since the distribution of the noise-energy over the reproduced frequency spectrum is favourably influenced. In fact, the noise energy is increased at lower frequencies and decreased at higher frequencies, similarly as occurs in receivers designed for receiving pre-emphasis frequency-modulated oscillations (privileging of high signal-frequencies), in which also a signal-frequencies integrating network is used at the receiver end.

Similarly to conventional pulse-modulation systems it is advantageous for noise-suppression in the present pulse-modulation system to lead the incoming pulses through a threshold and/or limiting device and to use a pulse-regenerator. In addition, deltapulse-code-modulation permits shifts in time of the incoming pulses and consequent noise to be considerably eliminated at the receiver end.

According to the invention, receivers for deltapulse-code-modulation comprise a pulse generator coupled with a frequency-corrector for producing equidistant pulses, and in addition means for substituting the incoming pulses by pulses from the sequence of equidistant pulses, which substitution pulses are, for instance, supplied to a relay transmitter or, through a signal-frequencies integrating network, to a loudspeaker, for instance.

The means for replacing the incoming pulses by pulses from a sequence of equidistant pulses preferably comprise a mixer stage (AFC-mixer stage) which is controlled by the incoming pulses and the locally produced equidistant pulses, and from which a control voltage is taken which is supplied to the frequency-corrector of the pulse-generator for automatic frequency-correction (AFC) of the recurrence-frequency of the equidistant pulses, and from the incoming pulses gating pulses are derived, for instance with the use of a gating-pulse generator controlled by the incoming pulses, which gating pulses, jointly with the pulses taken from the pulse generator, control a coincidence mixer stage. The locally produced pulses (substitution pulses) appearing in the output circuit of the coincidence mixer stage are supplied to the load.

It is emphasized that the aforesaid receivers for deltapulse-code-modulation are unsuitable for receiving pulse-modulation of the types supposed to be known in the foregoing.

In receivers according to the invention, similarly to known pulsecode-modulation-receivers, approximation of the actual signal occurs, since whenever receiving a pulse-shaped signal the amplitude level of the signal voltage shifts by a finite amount, which involves the aforesaid quantisizing noise. The present system, however, permits without any appreciable constructional difficulties, the quantisizing noise to be reduced by increasing the pulse-recurrence frequency used.

A considerable difference between the conventional systems of pulse-modulation and the present system, more particularly deltapulse-code-modulation, consists in that in known systems a quality of transmission suitable for telephony purposes is attained, if the pulse recurrence-frequency is approximately 2.5 times as high as the highest frequency of the intelligence signal to be transmitted, whereas in the present case a much higher pulse recurrence-frequency should be used for attaining the same transmission quality. According to the further invention the pulse recurrence-frequency, for instance for telephony, is chosen to be at least approximately 5 times as high as the highest signal frequency. A suitable value is a recurrence-frequency of 20.000 to 40.000 c./sec. which, consequently, substantially corresponds to the pulse-recurrence-frequency in known pulsecode-modulation systems with the use of the five-unit code and a recurrence-frequency of the pulse groups of 8.000 c./sec.

In order that the invention may be clearly understood and readily carried into effect it will now be described more fully with reference to the accompanying drawings, given by way of example.

Fig. 1 represents a transmitter according to the invention, which yields a sawtooth-shaped approximation-curve of the signal to be transmitted.

Figs. 2*a* and 2*b* represent voltage-time diagrams for explaining the operation of the transmitter shown in Fig. 1.

Figs. 3*a*, 3*b*, 3*c* represent diagrams for explaining the operation of a modified form of the transmitter shown in Fig. 1.

Figs. 14*a* to *d* represent voltage-time diagrams for comparing transmitters of different types falling within the scope of the invention, and Fig. 15 represents a relay-transmitter for use in a system according to the invention.

Figure 16:
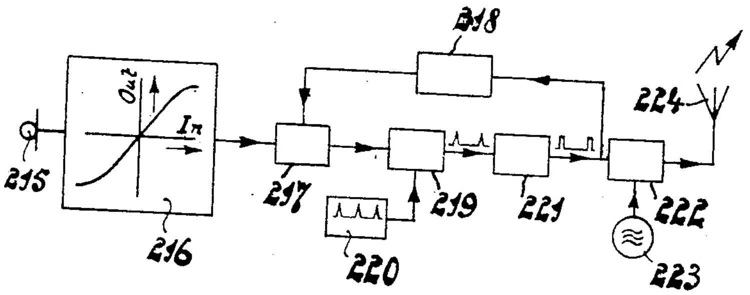
Figure 17:
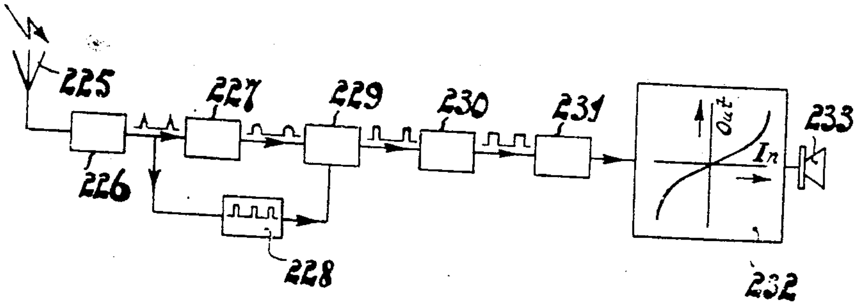

Figs. 16 and 17 represent a transmitter and receiver respectively according to the invention, in which improved transmission of signals is obtained with the use of a compression amplifier in the transmitter and an expansion amplifier at the receiver side.

Figure 1:
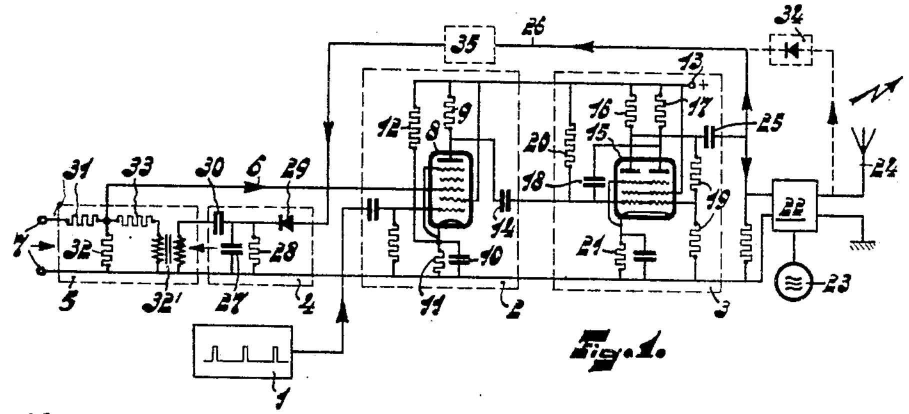

A transmitter for deltapulse-code-modulation is represented greatly simplified in Fig. 1. The transmitter comprises a pulse-sender with a pulse-generator 1 and switching means 2. In addition it comprises a pulse-repeater 3, an auxiliary receiver with a signal-frequencies integrating network 4 and a difference producer 5 having an output lead 6 by way of which the difference voltage referred to hereinafter is supplied to the switching means 2 of the pulse-sender. The signals to be transmitted are fed to the input terminals 7 of the transmitter.

The switching means 2 comprise an amplifying tube 8 of the hexode type with an output resistance 9 in the anode circuit. The amplifying tube 8 is normally cut off by means of a negative grid bias, in connection with which a cathode resistance 11 shunted by a condenser 10 is connected in the cathode-lead of the tube, of which cathode-resistance the end facing the cathode is connected, through a resistance 12, to the positive junction terminal 13 of the source of anode voltage (not shown). Equidistant pulses taken from the pulse machine 1 are supplied to the first control-grid of the hexode 8 but these pulses will not cause deblocking of the tube unless a control-voltage of positive polarity is set up at the second control-grid of the hexode.

As soon, however, as a positive voltage is supplied, through the lead 6, to the second control-grid of the hexode, the pulses supplied to the first control-grid and amplified are set up at the anode resistance 9 of the tube and are led, through a coupling condenser 14, to the pulse repeater 3.

The pulse repeater 3 comprises two cross-coupled pentodes 15 which are connected as a one-shot-multi-vibrator. The anode circuits of the pentodes comprise anode resistances 16 and 17 respectively. The control grid of the first pentode-system is coupled by way of a condenser 18 with the anode of the second pentode-system, and the control-grid of the last-mentioned pentode-system is galvanically coupled with the anode of the first pentode system with the use of a voltage divider 19. Moreover, the control grid of the first pentode-system is connected, through a high ohmic resistance 20, to the positive terminal 13 of the source of anode potential. The common cathode-lead of the pentode-system comprises a capacitively shunted cathode resistance 21.

The aforesaid circuit comprising two cross-coupled pentodes is known per se and for this reason its operation will not be explained in greater detail. In the so-called state of rest of this circuit the control grid of the first pentode-system carries grid current owing to the positive grid-bias applied across the resistance 20. Consequently, the anode current of the first pentode system is large and the potential of the anode thereof is comparatively low. A comparatively low voltage is set up across the voltage divider 19 connected between the anode of the first pentode-system and earth, and the positive voltage set up between earth and the control grid of the second pentode-system is not sufficient for surmounting the negative grid bias caused by the cathode resistance 21, so that the second pentode system is cut off. As soon, however, as the anode current of the first pentode system decreases due to a voltage pulse of negative polarity supplied to the control grid of the first pentode-system, the second pentode-system is made conductive and the circuit flops over as a result of the cross-coupling owing to which the first pentode-system is cut off and the second pentode-system conveys the full anode current. This state persists only for a time determined by the time constant of the discharge circuit of the coupling condenser 18. After the charge of the coupling condenser 18 has decreased to such a degree as to render the first pentode-system conductive, the circuit flops back into the state of rest. Upon a negative pulse being anew supplied to the control-grid of the first pentode-system the cycle described is repeated. By a judicious choice of the values of the coupling condenser 18 and grid-resistance 20 the period of conductivity of the second pentode-system can be controlled, for instance in such manner as to produce a voltage pulse of 1 microsecond at the anode resistance 16 of the first pentode-system.

The voltage pulses appearing at the anode resistance 16 are supplied, through a coupling condenser 25, to a modulator 22 for modulating a carrier-wave produced by a carrier-wave oscillator 23, and are transmitted with the aid of an aerial 24.

The voltage pulses appearing at the anode resistance 16, are, moreover, supplied, through the coupling condenser 25, to the signal-frequencies integrating network 4 by way of a feedback lead 26. The integrating network comprises a condenser 27 which is shunted by a leak resistance 28 and a series-resistance 29 constituted by a rectifier. The pulses from the anode resistance 16 have a positive polarity and are supplied, by way of the rectifier 29, to one of the electrodes of the integrating condenser, of which the other electrode is earthed.

The alternating voltage set up at the integrating condenser is supplied, through a coupling condenser 30, to the difference producer 5 which comprises three resistances 31, 32, 33 and a transformer 32'. The signal to be transmitted, which is supplied to the input terminals 7, is fed by way of resistance 31 to the resistance 32, and the alternating voltage set up at the integration condenser 27 is likewise supplied to the resistance 32 by way of the coupling condenser 30, the phase-inverting transformer 32' and the resistance 33. The resistances 31 and 33 have values which are high in comparison with that of the resistance 32 to avoid undue coupling between the input terminals 7 and the integration condenser 27. Consequently, the difference between the input voltage and the alternating voltage on the integration condenser 27 is set up at the resistance 32.

The operation of the transmitter described will be explained with reference to Fig. 2. Fig. 2*a* shows the variation of the signal voltage to be transmitted and of the voltage on the integration condenser 27 as a function of time. A voltage corresponding with the difference of these voltages is set up at the resistance 32. The curve *a* represents the signal to be transmitted, and the sawtooth curve *b* avoiding about the curve *a* represents the alternating voltage on the integration condenser 27. Considering the state just before the instant indicated by $t_1$ in Fig. 2*a* it appears that the signal-voltage has a positive instantaneous value, whereas the voltage on the integration condenser is approximately zero. Hence, a difference voltage of positive polarity is set up at the resistance 32, which voltage is supplied by way of the lead 6 to the second control-grid of the hexode 8 and renders it conductive, so that the pulse coming from the pulse-generator at the instant $t_1$ triggers the pulse repeater 3. The positive pulse thus supplied to the integration condenser 27 by way of the coupling condenser 25, the feed-back lead 26 and the rectifier 29 causes a voltage increase at the integration condenser, as shown at *c* in the diagram of Fig. 2*a*. Since the amplitude and duration of the pulse supplied by the pulse regenerator 3 is independent of the amplitude and duration of the pulse from the hexode 8, the voltage on the integration condenser 27 varies, with suitable proportioning of the circuit elements consistently by the same amount independently of the value of the difference voltage set up at resistance 32.

After the instant $t_1$ the voltage on the integration condenser gradually decreases due to the leak resistance 28 causing again a positive difference voltage at the instant $t_2$; the pulse repeater 3 is again triggered and "abrupt" charging of the integration condenser is repeated, which causes an equally great voltage variation as at the instant $t_1$. After the instant $t_2$ the voltage on the integration condenser again decreases, but not sufficiently for setting up, as before, a positive difference voltage at the resistance 32 at the instant $t_3$, with the result that the pulse from the pulse generator 1 at the instant $t_3$ does not produce anode current in the hexode 8. Hence, the pulse repeater 3 is not triggered at this instant and the integration condenser is not abruptly charged. At the next instant $t_4$, however, a positive difference voltage is again set up at the resistance 32 with the result that the voltage on the integration condenser again increases by a given amount.

The integrating network functions as a "memory" network, since on reception of a pulse, starting from the prevailing condenser voltage, the latter never remains the same but consistently varies by a certain amount.

In this manner the voltage set up at the integration condenser exhibits a sawtooth waveform, which winds about the signal-voltage to be transmitted and thus approximates it. The pulses required for producing the approximation or comparison voltage are indicated in full lines in Fig. 2*b* and are transmitted by way of the modulator 22 and the aerial 24, whereas the pulses from the pulse generator 1, which are suppressed by the hexode 8 owing to the absence of a positive difference voltage, are indicated in dotted lines in Fig. 2*b*.

In the foregoing it has been taken for granted that the strength of the discharge current of the integration condenser 27 between the appearance of two pulses is independent of the voltage on the integration condenser. This supposition is permissible, provided that the average direct voltage on the integration condenser is high in comparison with the amplitude of the alternating voltage set up at the integration condenser, which alternating voltage is transferred to the difference producer 5. By a judicious proportioning of the charge and discharge circuit of the integration condenser 27 this state is secured practically without any difficulty, which is desirable but not necessary.

Figures 2A, 2B:
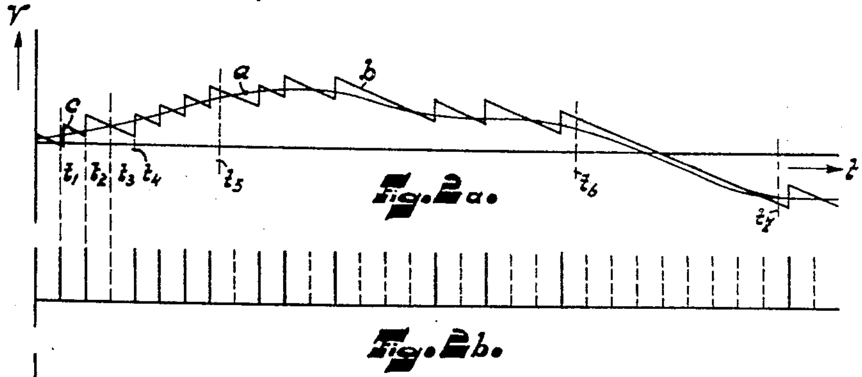

Considering Fig. 2*a* it will be obvious that the voltage on the integration condenser, taken as an average over a time comprising several cycles of the pulse-recurrence-frequency, cannot increase or decrease in an unlimited rapid manner. The maximum increase in voltage on the integration condenser occurs when none of the equidistant pulses taken from the pulse generator 1 is suppressed by the hexode 8 as is the case in Fig. 2*a* between the instants $t_4$ and $t_5$. The maximum decreasing-speed of the voltage on the integration condenser occurs if all pulses of the pulse generator 1 are suppressed, as is the case between the instants $t_6$ and $t_7$. As the signal-frequency is lower a greater signal-amplitude is consequently permissible. In the present system, in contradistinction to other transmission systems, no definite constant maximum limit is set to the signal-amplitude, but the variation speed of the signal to be transmitted should not exceed a given maximum value.

The pulses supplied to the integrating network 4 by way of the feedback lead 26 may be taken from an arbitrary point of the transmitter cascade after the pulse repeater 3. For example, the pulses may be taken from the output circuit of the transmitter through the intermediary of a detector 34 shown in dotted lines.

Furthermore, the feedback lead 26 may comprise an amplifier and, if desired, a pulse-widener.

Figure 3A:
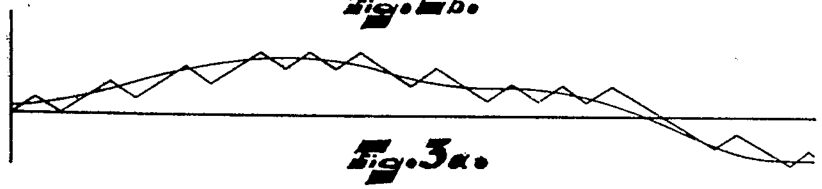
Figure 3B:
Figure 3C:
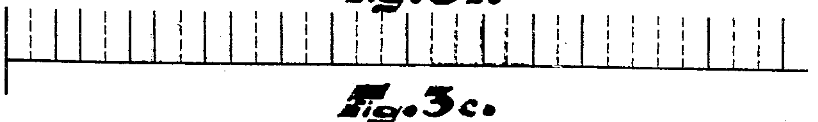

In Fig. 1 such a pulse-widener 35 is represented diagrammatically. It widens the transmitted pulses shown in Fig. 3*c* in such manner as to produce the widened pulses shown in Fig. 3*b*. In connection with the use of the pulse-widener the construction of the integrating network 4 can be altered, for instance by connecting a resistance between the rectifier 29 and the pulse-widener 35 (or by replacing the rectifier 29 by a resistance), by which resistance the charging current of the integration condenser 27, which occurs during a pulse, is reduced to a value corresponding to the discharge current which occurs in the absence of a pulse. In the same manner as described with reference to Fig. 2, a voltage curve is then set up at the integration condenser 27, which approximates the signal to be transmitted, but now this curve exhibits, as shown in Fig. 3*a*, a triangular variation instead of a sawtooth variation. In Fig. 3*c* the pulses supplied by the pulse-generator 1 and transmitted upon a positive difference voltage being set up at the resistance 32, are again indicated in full lines, whereas the suppressed pulses are shown in dotted lines.

Figure 4:
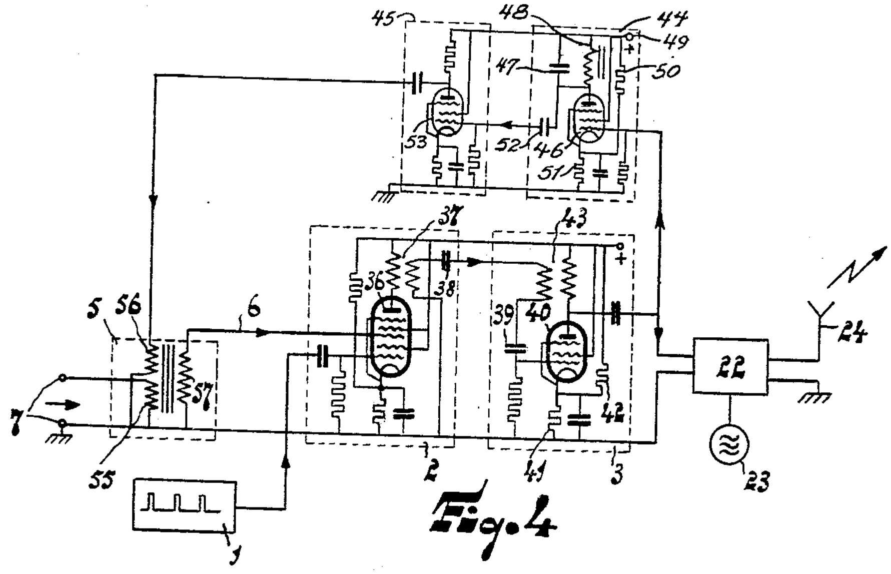
Figs. 4 and 5 represent variants of transmitters according to the invention, the operation of the transmitter depicted in Fig. 5 being explained with reference to the voltage-time diagrams shown in Figs. 6*a* and 6*b*.

Fig. 4 represents one form of a transmitter for delta-pulse-code-modulation, which operates similarly to the transmitter shown in Fig. 1, but its construction is very different. The transmitter again comprises a pulse generator 1 and switching means 2 which are controlled by a difference voltage supplied by way of a lead 6 and comprise a hexode 36 similarly to the hexode 8 shown in Fig. 1, by which the pulses from the pulse generator 1 are transmitted or not transmitted, in accordance with the polarity of the supplied difference voltage, to a pulse repeater 3. The output circuit of the hexode 36 comprises the primary winding of a transformer 37, of which the secondary is coupled, by way of a coupling condenser 38 and a grid condenser 39, to the control grid of a tube 40 connected as a pulse generator. The tube 40 forms part of an oscillator circuit of a type known per se, the oscillator tube being normally cut off by a capacitatively shunted resistance 41 placed in the cathode lead of the tube and forming part of a voltage divider 41, 42 connected between the positive connection terminal of the source of anode potential and earth. As soon, however, as a positive voltage pulse is supplied to the control-grid of the tube, the circuit starts oscillating due to backcoupling provided between the anode- and grid-circuit of the tube with the aid of transformer 43. However, this backcoupling is chosen to be so strong that essentially only the first positive half cycle of the occurring oscillations is produced and the tube cuts off itself immediately due to the grid condenser 39 being charged as a result of grid current, until a following pulse supplied to the control-grid again initiates the production of a pulse-shaped anode current.

The pulses occurring across the anode circuit of the oscillator tube 40 are fed on the one hand to the modulator 22 with carrier-wave oscillator 23 and aerial 24 connected thereto, and on the other hand to an auxiliary receiver constituted by parts 44 and 45. The part 44 comprises an amplifying tube 46 of the pentode type, the anode circuit of which includes an integrating network comprising an integration condenser 47 and a choke 48. With the use of a potentiometer comprising a resistance 50 connected to the positive terminal 49 of an anode voltage supply (not shown) and a capacitatively shunted cathode resistance 51, the tube 46 is so biased as to be exactly cut off. Starting with the condition in which across the integration condenser 47 is effective a definite direct voltage which is only permitted to leak away slowly through the choke 48, which constitutes a very high impedance for signal frequencies, the integration condenser 47, during the occurrence of a pulse of positive polarity across the control-grid of the tube 46, has supplied to it a definite charge which does not vary with the anode voltage of the pentode, with the result that the voltage across the integration condenser increases by a definite value. The alternating voltage occurring across the integration condenser is fed, through a coupling condenser 52, to the part 45 of the auxiliary receiver, which comprises a pentode 53, connected as a resistance amplifier. The alternating voltage is thus fed from the integration condenser through the amplifier 45 and a conductor 54, to the difference-producer 5.

The difference producer 5 comprises a transformer having two primary windings 55 and 56, which have fed to them the signal voltage to be transmitted (through terminals 7) and the comparison voltage taken from the amplifier 45 respectively. Set up across the secondary 57 of the transformer is the difference voltage which is fed through the conductor 6 to the second control grid of the hexode 36 and of which the polarity decides the passage or non-passage of the equidistant pulses produced by the pulse generator 1. The signal to be transmitted, the approximation voltage taken from the amplifier 45 and the transmitted and cut-off pulses of the pulse generator 1 may again be illustrated by the diagrams of Figs. 2a and 2b. The transmitter shown in Fig. 4 also permits the use of a pulse-widener which is included in the feedback conductor.

It should be noted that also in the embodiment shown in Fig. 4 the integration condenser 47 has maintained across it preferably a mean direct voltage which appreciably exceeds the amplitude of the alternating voltage occurring across the integration condenser. This condition is achieved by providing that each time a pulse occurs a materially higher charge is supplied to the condenser than is permitted to leak away between every two pulses. Since the strength of the discharge current of the integration condenser across the leak resistance or choke connected in parallel therewith increases with the voltage across the condenser, a definite equilibrium is automatically established with an originally chosen charging current strength during a pulse, at a definite mean direct voltage across the condenser. If pulses of small duration are fed to the integration condenser, provision should be made, as in the case of Fig. 1, that the charging time constant of the integration condenser is low compared with the discharging time constant. If widened pulses are fed to the condenser, the charging and discharging time constants may be chosen to be of the same order of magnitude. For maintaining or supporting a definite mean direct voltage across the integration condenser a constant auxiliary charging current may be supplied to it.

Figure 5:
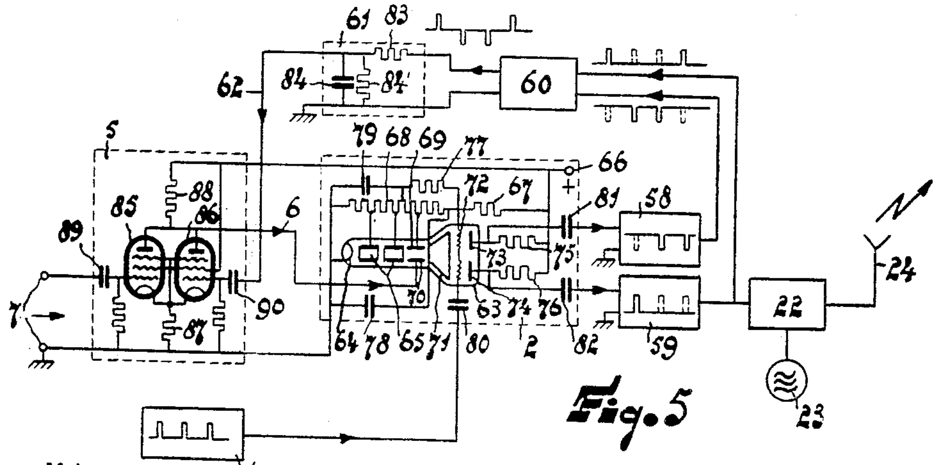

It is not necessary to construct the transmitter shown in Figs. 1 and 4 so that a definite, mean direct voltage occurs across the integration condenser, since by supplying pulses of opposite polarity to the integration condenser, it has produced across it the desired approximation voltage without a direct voltage component occurring. Fig. 5 shows, by way of example, one form of such a transmitter according to the invention, the operation of which will be described with reference to the diagrams of Fig. 6.

The transmitter shown in Fig. 5 comprises a generator 1 which produces equidistant pulses which are fed to a control device 2 controlled by the difference voltage and which thus, as a function of the polarity of the difference voltage, trigger a pulse-repeater 58 or 59. These pulse-repeaters 58 and 59 produce pulses of opposite polarity, which, if necessary after widening as in Fig. 3, are fed, through a combination amplifier 60 to a network 61 integrating signal-frequencies. The output voltage of the integrating network is fed through a conductor 62 to the difference producer 5, to which, in addition, the signal to be transmitted is supplied across the input terminals 7. Again, the difference voltage occurs at the output conductor 6 of the difference producer.

The elements of the transmitter shown in Fig. 5 and referred to hereinbefore will now be set out in detail, in so far as required, for an understanding of the invention.

The control device 2 comprises a control tube 63 with means for producing an electron beam. These means are diagrammatically shown by a cathode 64 and two focussing electrodes 65 which are connected to different points of a potentiometer comprising resistances 67 and 68 and connected between the positive terminal 66 of an anode-voltage source (not shown) and earth. The electron beam thus produced passes by deflecting plates 69 and 70 and an additional focussing electrode 71 which is shaped in the form of a truncated cone. It then passes through a grid electrode 72 and then, as a function of the voltage across the deflecting plates 69 and 70, strikes one of two electrodes 73 or 74 which are constructed to form secondary-emission auxiliary cathodes and which are connected through resistances 75 and 76 respectively of very high value, for example, 1 M ohm, to the positive terminal 66 of the anode-voltage source. The deflecting plates 69 and the focussing electrode 71 are connected to tapping points of the aforesaid potentiometer 67, 68 and thus receive a direct voltage which exceeds the direct voltage across the grid electrode 72, which acts as the anode of the tube and which is connected through a resistance 77 also to a tapping point of the potentiometer 67, 68. The direct voltages fed to the focussing electrode 71 and to the anode 72 are smoothed by condensers 78 and 79 respectively.

The control device 2 and its control tube 63 operates as follows: If the electron beam in the tube 63 is directed in such manner that the secondary-emission electrode 73 is struck, the secondary electrons released from this electrode will travel towards the anode 72; if, however, the potential of the anode 72 exceeds that of electrode 73, they will recur to the electrode 73 if the latter exhibits a higher potential. If the number of primary electrons striking the electrode 73 exceeds the number of secondary electrons emanating from this electrode and passing to the anode 72, the potential of the electrode 73 will be lower than the potential of the positive terminal 66 of the anode voltage source. The direct current then flowing to the electrode 73 may be denoted as a direct current of positive polarity. However, if the number of secondary electrons emanating from the electrode 73 exceeds that of the primary electrons striking it, a direct current of negative polarity is produced, with the result that the potential of the electrode 73 becomes higher than that of the terminal 66. It is thus found that the potential of the electrode 73 may be made completely a function of the number of secondary electrons emanating from this electrode. If the influence of the potential of the anode 72 is now allowed for—this potential decides the recurrence or non-recurrence to the electrode 73 of all the secondary electrons released by the primary electrons or part of the said secondary electrons—it will be obvious that, provided that the resistance 75 in the circuit of the secondary-emission electrode 73 is chosen to be sufficiently high, the potential of the electrode 73 is adjusted so as to correspond substantially with the potential of the anode 72. If the potential of the anode 72 is increased or decreased, the potential of the electrode 73 will immediately follow this potential variation. The anode 72 is connected through a coupling condenser 80 to the pulse generator 1 and thus pulses produced thereby will be transmitted, through the anode 72, to the electrode 73 if the electron beam is directed on to the latter electrode. However, if the electron beam is directed on to the secondary-emission electrode 74, the pulses produced by the pulse generator 1 will be transmitted, through the anode 72, to the electrode 74. The tube 63 thus operates essentially as a switch having an alternating contact, in which pulses supplied to it are fed either to the electrode 73 or to the electrode 74, as a function of the voltage across the deflecting plates.

The direction of the electron beam in the tube is controlled by the difference voltage obtained from the difference producer 5 and fed through conductor 6 to the deflecting plate 70. In the absence of a difference voltage the electron beam is directed centrally, whereas with the occurrence of a difference voltage, as a function of its polarity, the electrode 73 or 74 is struck. The pulses transmitted to these electrodes are fed through coupling condensers 81 and 82 respectively, to pulse repeaters 58 and 59 respectively, which may be realised in a similar manner as the pulse repeaters 3 of Figs. 1 and 4, but for the output circuits of these pulse repeaters being chosen to be such that the pulse repeater 58 produces pulses of negative polarity and the pulse repeater 59 pulses of positive polarity, as is diagrammatically shown in the figure. The pulses produced by the pulse generator 1 are thus converted, in accordance with the polarity of the difference voltage produced across the conductor 6, into negative or positive pulses, which are fed to an auxiliary receiver, the input of which includes a combination amplifier 68. This combination amplifier may be constructed to form an A-amplifier comprising a hexode, to the various control-grids of which the pulses of positive and negative polarities are fed, so that the output circuit of the combination amplifier has produced across it a series of equidistant pulses of alternating polarities, as denoted in Fig. 5 between the parts 60 and 61. The latter sequence of pulses is fed through a series resistance 83 to an integration condenser 84 having a leak resistance 84′, the latter having such a high value that between two successive pulses there is practically no loss of voltage across the condenser 84. If a pulse of positive polarity is fed to the integration condenser 84, the condenser voltage will rapidly increase; on receipt of a pulse of negative polarity the voltage across the integration condenser decreases by a definite amount. The idealized variation of the voltage across the integration condenser is denoted in Fig. 6*a* by the rectangular curve *d*. Moreover, in Fig. 6*a* the signal voltage fed to the input terminals 7 is denoted by curve *a*. In a manner similar to that described with reference to Fig. 2 the integrating network 61 has produced across it a voltage which forms an approximation to the signal to be transmitted.

The difference producer 5 of the transmitter of Fig. 5 comprises a circuit having two pentodes 85 and 86 which have in common a cathode resistance 87 and an anode resistance 88, the control-grids of the two pentodes respectively having fed to them, through coupling condensers 89 and 90, the signal to be transmitted through input terminals 7 and the approximation voltage through conductor 8. The common anode resistance 88 has produced across it a voltage which corresponds with the difference between the signal and the approximation voltages and which may thus be fed, as a difference voltage, through conductor 6 to the control device 2.

Figure 6A:
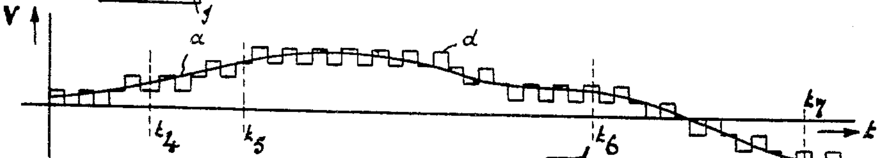
Figure 6B:
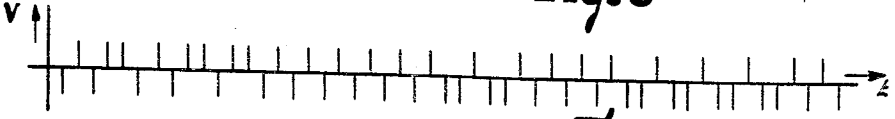

Whereas the auxiliary receiver has supplied to it pulses of negative and of positive polarities, it is not required to transmit all these pulses. It is sufficient to emit pulses of only one polarity; either the positive or the negative pulses may be emitted at will, since each of them comprises the intelligence required for the reproduction of the transmitted signal at the receiver end. Since only pulses originating from a sequence of equidistant pulses are emitted, it is possible, though not essential, to add, at the receiver end, to the incoming sequence of pulses of, for example, positive polarity pulses of negative polarity at those instants at which pulses fail. When dealing with the receivers to be used in the present system this will be described more fully. In the transmitter shown in Fig. 5 only the pulses taken from the pulse repeater 59 are fed, through modulator 22, to the aerial 24 and are emitted. Of the pulses of positive and negative polarity which are shown in Fig. 6*b* and which are fed to the auxiliary receiver 60, 61, only the positive pulses are consequently transmitted to the main receiver.

It should be noted here that instead of emitting pulses emitted by transmitters as shown in Figs. 1, 4 and 5, double or triple pulses may, if desired, be emitted, so as to limit interference, as is known per se for improving the signal-noise ratio in the transmission of signals with the use of pulse-modulation. It is in addition obvious that the emitted carrier-wave may be modulated by the pulses in different ways, for example, be subject to amplitude-, phase- or frequency-modulation. Finally the pulses may, of course, be emitted as a modulation of, say, luminous waves or else as direct current pulses through a conductor.

In the transmission of a plurality of signals in a system for multiplex transmission in time-distribution with the use of deltapulse-code-modulation, the pulse generator provided in the transmitters shown in Fig. 1, 4 or 5 may be in common to a plurality of transmitting channels, the pulse-recurrence-frequency being, of course, necessarily increased in accordance with the number of channels.

We now proceed with a discussion of the receivers for deltapulse-code-modulation to be used in conjunction with the transmitters shown in Figs. 1, 4 and 5.

Figures 7, 8A, 8B, 8C, 8D, 8E, 8F, 8G, 8H:
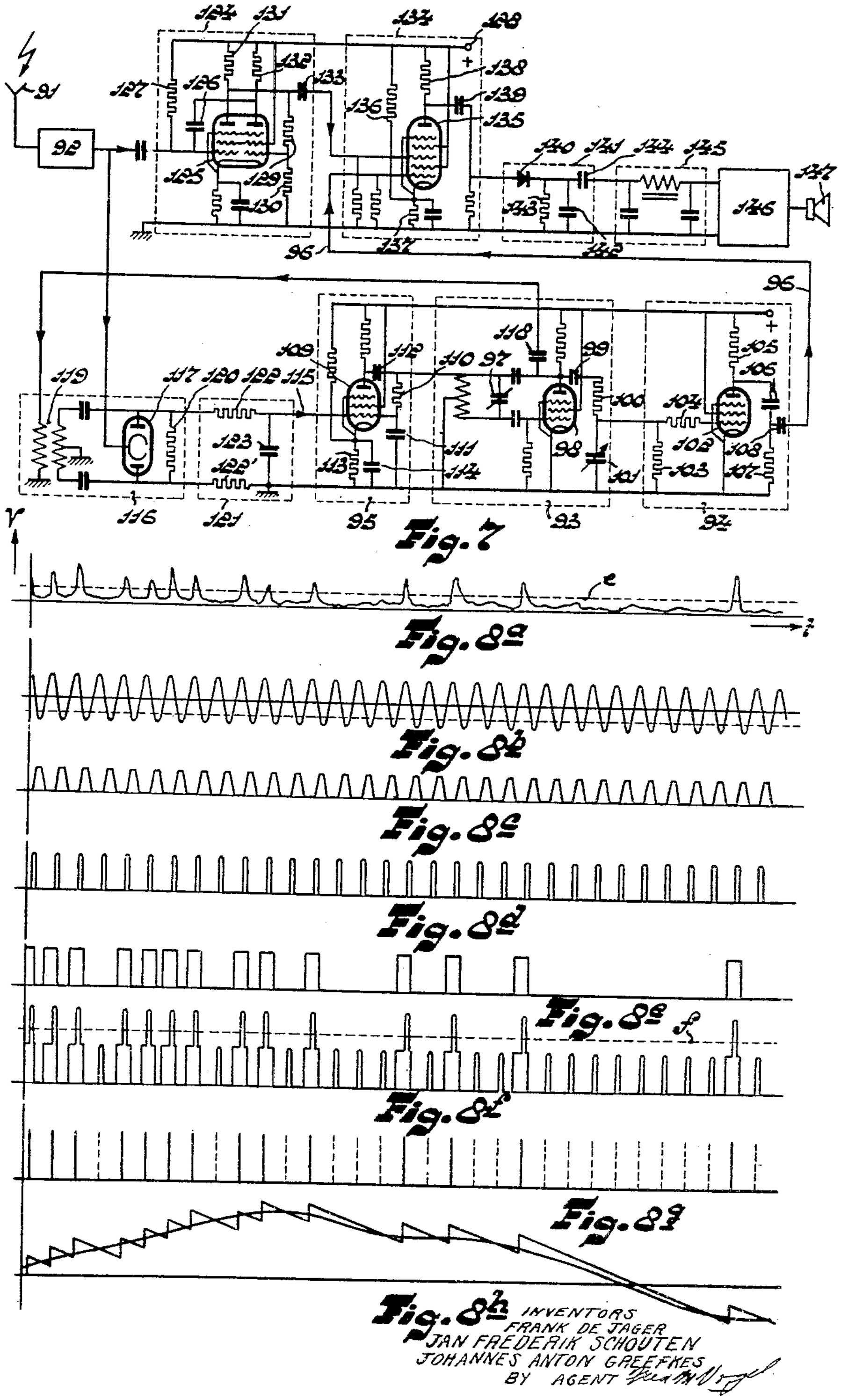
Fig. 7 is a detailed view of an example of a main receiver for deltapulsecode-modulation for use in a system according to the invention, which yields a sawtooth-shaped approximation curve of the transmitted signal-voltage, as will be explained with reference to the diagrams shown in Figs. 8*a* to *h*.

Fig. 7 shows a receiver with the use of which for example the intelligence signals emitted with the use of a transmitter as shown in Fig. 1 are to be reproduced, and in which in this main receiver, similarly to the auxiliary receiver of the transmitter of Fig. 1, a sawtooth-shaped approximation curve of the transmitted signal is produced.

The signals received by an aerial 91 are fed to a high-frequency amplifier comprising a detector realised in a manner known per se, this construction being shown in Fig. 7 in block form at 92. The detected pulses occurring across the output circuit of 92 exhibit negative polarity and are shown in Fig. 8*a*, for the sake of simplicity, as pulses of positive polarity, any noise voltages being allowed for. Owing to interference and variations in the transmission path between transmitter and receiver the amplitude of the signal pulses varies to a marked extent, whilst, moreover, the shape and position of the signal pulses are subject to variations. In Fig. 8*a* vertical dotted lines designate the positions which the signal pulses would occupy if they coincided with pulses out of a sequence of equidistant pulses. A horizontal dotted line *e* indicates a definite threshold level and shows that the points at which the pulses cross this threshold level do not correspond with points at which pulses out of a sequence of equidistant pulses would cross this threshold level.

Deltapulse-code-modulation permits of correcting time-shifts of signal pulses. For this purpose the receiver shown in Fig. 7 comprises a pulse generator for producing equidistant pulses, which comprises an oscillator 93, a pulse producer 94 and a frequency corrector 95. The locally produced, equidistant pulses occur across conductor 96.

The oscillator 93 serves to produce a sinusoidal voltage of a frequency corresponding with the pulse-recurrence-frequency and is connected as a Hartley oscillator. The two ends of an oscillatory circuit 97 are capacitatively coupled with anode and control-grid respectively of a pentode 98, whereas a tapping of the coil of the oscillatory circuit 97, similar to the cathode of the tube 98, is connected to earth potential. The anode of the tube 98 has produced across it a sinusoidal voltage as shown in Fig. 8*b*. This voltage is fed, through a coupling condenser 99, to a phase-shifting network comprising a resistance 100 and a variable condenser 101. The voltage taken from the phase-shifter, which voltage is shown in the correct phase in Fig. 8*b*, is fed to the control-grid of an amplifying tube 102 provided in the pulse producer 94. This amplifying tube comprises a control-grid which has no negative bias voltage supplied to it in that the grid resistance 103 is connected directly to the cathode of the tube 102. Provision is furthermore made of a grid-current limiting resistance 104. The control-grid space of the tube 102 is smaller than the amplitude of the sinusoidal oscillations of Fig. 8*b* supplied thereto. Owing to the absence of a grid bias voltage, the positive half waves of the sine voltage of Fig. 8*b* will be completely cut off due to the effect of the grid-current limiting resistance 104, and only part of the negative half waves becomes operative, since the tube 102 is cut off at the occurrence of the negative peak values of the grid voltage. Hence, in the anode circuit of the tube 102 the anode resistance 105 has produced across it trapezium-shaped voltage pulses of positive polarity, which are shown in Fig. 8*c*. These trapezium-shaped voltage pulses are fed to a differentiating network which is connected to the anode of tube 102 and which comprises the series combination of a condenser 106 and a resistance 107, which is connected to earth potential at one end. At each trapezium-shaped voltage pulse at the anode of tube 102 the resistance 107 of the differentiating network has produced across it a positive voltage pulse and a negative voltage pulse which are fed through coupling condenser 108 to the conductor 96. Of these positive and negative voltage pulses only the pulses of positive polarity become effective in the remaining part of the apparatus; these pulses are shown in Fig. 8*d*.

The pulses shown in Fig. 8*d* are equidistant and have, for example, a duration of 1 microsec. Their phase is adapted to be adjusted by the variable phaseshifter 100, 101. The recurrence-frequency is given by the tuning frequency of the oscillator 93. This recurrence-frequency must correspond accurately with the recurrence frequency of the pulses produced by the pulse generator of the transmitter of Fig. 1.

To enable this the frequency-determining circuit 97 of the oscillator 93 has connected to it in parallel a frequency corrector 94, which comprises a pentode 109 connected as a variable reactance. The pentode comprises a control-grid which is connected to a phase-shifting network comprising a resistance 110 and a condenser 111 and connected in parallel with the tube through a coupling condenser 112, so that the anode alternating voltage is fed to the control-grid with a phase-shift of approximately 90°. The anode of the pentode 109 is connected to the anode side of the oscillatory circuit 10. With the use of a potentiometer comprising a cathode resistance 113 and a shunting condenser 114 the control-grid of the tube receives a suitable negative grid bias voltage. As is well-known such an amplifying tube with wattless back-coupling behaves like a reactance, the value of which is adapted to be varied by a control-voltage supplied to the control-grid through a conductor 115.

For producing the control-voltage required for automatic frequency correction (AFC) of the oscillator 93 provision is made of an AFC-mixing stage 116. This mixing stage comprises two push-pull diodes which are housed in a single tube 117 and to which sinusoidal oscillations obtained through a coupling condenser 118 from the anode of the oscillator tube 98 are supplied in push-pull with the use of a transformer 119. In addition the signal pulses taken from the detector 92 and shown in Fig. 8*a* are supplied in the same phase and with negative polarity to the two diodes 117. In such a push-pull mixing circuit, which is supplied in the manner described, an output resistance 120 connected between the anodes of the diodes has produced across it an output voltage, the value and polarity of which are functions of the time interval between the occurrence of the pulses of Fig. 8a and the zero passages of the sine voltage of the oscillator 93. If the pulses occur at an instant when the instantaneous value of the sine voltage is positive, a positive output voltage is produced; if a negative instantaneous value coincides with the occurrence of a pulse, a negative output voltage is produced. Hence, this output voltage varies with the phase of the pulses relatively to the alternating sine voltage and may be utilized for correcting the phase of the alternating sine voltage in order to alter its phase to accord with the phase of the pulses. For this purpose, the output voltage of the push-pull mixing stage 116 is fed through a low-pass filter 121 to the control-grid of the tube 100, which is connected as a variable reactance. The time constant of the low-pass filter, which comprises resistances 122, 122′ and a smoothing condenser 123 is chosen to be such that the voltage occurring across the condenser 123 is practically incapable of following alternating voltages of frequencies corresponding with the lowest signal frequencies. Since the maximum interval between successive signal pulses as shown in Fig. 8a is materially smaller than one period of the lowest signal frequency, the condenser 123 of the smoothing filter 121 has produced across it a direct voltage which practically does not fluctuate in the rhythm of the minimum recurrence-frequency of the signal pulses. However, the direct voltage occurring across the condenser 123 will vary in value and polarity with the mean phase difference between the signal pulses and the sine voltage originating from the oscillator 93, with the result that the phase (and thus the frequency) of the voltage of the oscillator 93 is corrected by the signal pulses and synchronism is achieved between the frequency of the oscillator 93 and the pulse generator 1 of the transmitter of Fig. 1.

In order to eliminate time shifts of the signal pulses, the latter pulses are replaced in the receiver of Fig. 7 by pulses originating from the pulse generator 93—95. For this purpose the signal pulses of negative polarity taken from the detector 92 and shown in Fig. 8a are fed to a gating pulse generator 124, which comprises two crosswise-coupled pentode systems housed in a single tube 125. The circuit-arrangement of the gating pulse generator 124 corresponds essentially with the circuit-arrangement of the pulse generator 3 of Fig. 1. Again, the control-grid of the first pentode system is coupled by a condenser 126 to the anode of the second pentode system and, in addition, through a grid resistance 127 to the positive terminal 128 of an anode voltage source (not shown). The control-grid of the second pentode system is galvanically coupled through a resistance 129 to the anode of the first pentode system and earthed through a grid resistance 130. The anode circuits of the pentode systems include anode resistances 131 and 132 respectively. In the position of rest the first pentode system is conducting and the second is cut off. If the control-grid of the first pentode system has fed to it a pulse of negative polarity, the circuit flops over and the anode resistance 131 has set up across it a pulse of positive polarity of a duration which is determined by the time constant of the discharge circuit of the condenser 126. By a suitable choice of the value of the grid resistance 127 this time constant is such that each time a signal pulse occurs the gating-pulse generator produces a pulse of a duration which approximately corresponds with half the minimum interval between two signal pulses. The anode resistance 131 has thus produced across it the positive gating pulses shown in Fig. 8e, which are fed, through a coupling condenser 133, to a coincidence mixing stage 134.

The coincidence mixing stage 134 comprises an amplifying tube 135 of the hexode type which normally is cut off by a negative grid bias voltage, obtained from a potentiometer comprising a resistance 136 and a capacitively shunted cathode resistance 137. The first control-grid of the hexode 135 has supplied to it the pulses of positive and negative polarities taken from the pulse generator 93—95, through conductor 96. The bias voltage of the tube is, however, chosen to be such that in the absence of a positive control-voltage at the second grid of the tube 135, the positive pulses at the first control-grid are not capable of rendering the tube conductive. The negative pulses are always cut off. Deblocking of the tube by the positive pulses supplied through the conductor 96 only occurs if they coincide with the gating pulses taken from the gating pulse generator 124 and fed, through coupling condenser 133, to the second control-grid. Fig. 8f shows the two control-voltages supplied to the tube 135 combined, it being possible for the phase relation between the two pulses to be controlled by the phase-shifter 100—101. A horizontal dotted line f indicates a threshold level which must be crossed by the combined control voltages in order to effect deblocking of the tube 135. The figure shows that only the pulses of the pulse generator 93—95 which coincide with gating pulses occur across the anode circuit of the tube 135. The latter, the so-called substitution pulses are denoted in Fig. 8g by full lines, whereas the suppressed pulses are denoted by dotted lines.

The substitution pulses of Fig. 8g occurring across the anode resistance 138 of the coincidence mixing stage are fed through a coupling condenser 139 and a rectifier 140, which also acts as a series resistance, to a network 141 integrating signal-frequencies and comprising an integration condenser 142 and a leak resistance 143.

This integrating network fully corresponds with the network shown in Fig. 1 at 4. As in the transmitter of Fig. 1, it has fed to it definite pulses out of a sequence of equidistant pulses each time the detector 92 of the receiver shown in Fig. 7 produces a pulse. However, the substitution pulses fed to the integrating network 141 do not exhibit any time shifts like the signal pulses shown in Fig. 8a.

In a similar manner as has been set out with reference to Fig. 2a for the transmitter of Fig. 1, the integration condenser 142 of the receiver shown in Fig. 7 has produced across it a saw-tooth-like approximation (cfr. Fig. 8h) of the transmitted intelligence signal. This approximation voltage is fed, through a coupling condenser 144 and a low-pass filter 145, which serves to attenuate the components of the pulse-recurrence-frequencies occurring in the approximation voltage, to a low-frequency amplifier 146 and a loudspeaker 147 connected thereto. The saw-tooth-like approximation voltage and the signal voltage derived therefrom with the use of a smoothing filter 145 are shown in Fig. 8h.

Figure 9:
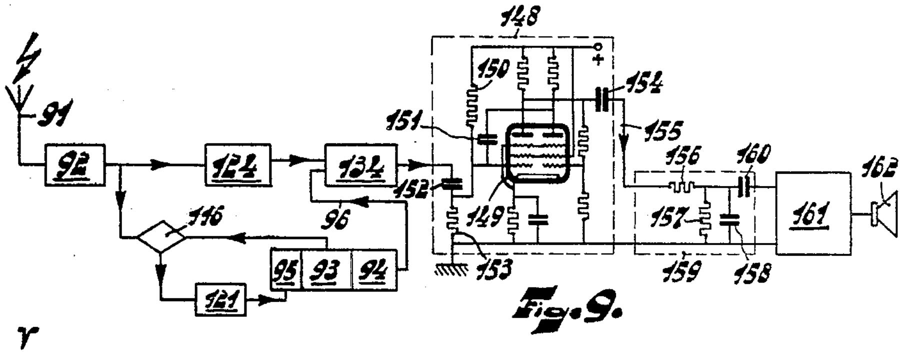
Figs. 9 and 11 represent receivers yielding a triangularly varying approximation curve of the transmitted signal, as will be explained with reference to the diagrams shown in Figs. 10*a* to *e*.
Figures 10A, 10B, 10C, 10D, 10E:
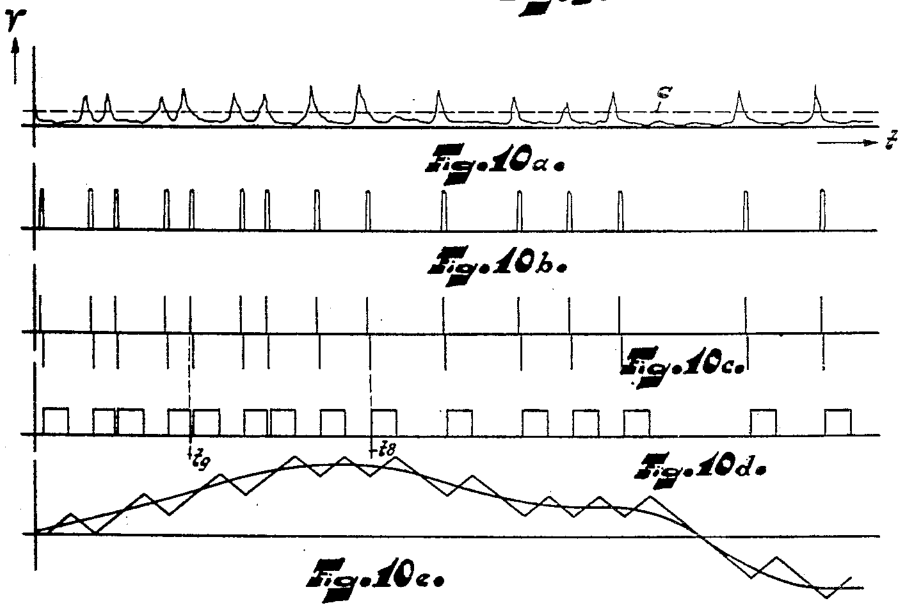

Fig. 9 shows a receiver for deltapulse-code-modulation, in which a triangular approximation voltage of the transmitted signal is produced. As in the receiver of Fig. 7 the pulse-like signals received by an aerial 91 are fed to a high-frequency amplifier and a detector 92, the output circuit of which has set up across it the pulse-like voltages shown in Fig. 10*a*, which correspond with pulses transmitted as shown in Fig. 3*c*. As in the receiver shown in Fig. 7, the signal pulses are replaced by proximate pulses out of a sequence of locally produced, equidistant pulses. These equidistant pulses are taken from a pulse generator comprising an oscillator 93, a frequency corrector 95 and a pulse producer 94, the tuning frequency of the oscillator 93 being corrected with the use of the automatic frequency control voltage fed to the frequency corrector 95 through the low-pass filter 121, and produced by mixing the signal pulses with the voltage of the oscillator 93 in the AFC-mixing stage 118. The signal pulses trigger the gating pulse generator 124, the output voltage of which is combined with the equidistant pulses produced by the pulse generator 93—95 in the coincidence mixing stage 134 in a manner such that the output circuit of the coincidence mixing stage has produced across it, each time a signal pulse occurs, a substitution pulse initiating from the sequence of equidistant pulses. These pulses are shown in Fig. 10*b* and are fed to a pulse-widener 148. This pulse-widener serves to produce pulses of constant amplitude and of a duration which corresponds with one period of the recurrence-frequency of the locally produced, equidistant pulses.

The pulse-widener comprises two pentode systems with crosswise feedback housed in a single tube 149. The circuit-arrangement corresponds essentially with that of the gating-pulse-generator 127 of Fig. 7 but for the time constant of the discharge circuit of the back-coupling condenser 151 being higher by suitable choice of the value of the grid resistance 150, so that the duration of the pulses produced satisfies the condition described in the foregoing paragraph.

The substitution pulses of Fig. 10*b* obtained from the coincidence mixing stage 134 are fed through a differentiating network comprising a condenser 152 and a resistance 153 to the control-grid of the first pentode system which is conductive in the position of rest of the pulse-widener 148. In its position of rest the pulse-widener is only sensitive to pulses of negative polarity. The occurrence of a negative pulse at the control-grid of the first pentode system is ineffective during the time when the first pentode system is cut off and the second system is conductive. In order nevertheless to ensure, under any condition, response of the pulse-widener to the occurrence of a substitution pulse across the output circuit of the coincidence mixing stage 134, a differentiating network 152—153 is arranged in the control-grid circuit of the pulse-widener 148. Each time a pulse occurs across the input terminal of the differentiating network, the resistance 153 of the differentiating network has produced across it a pulse of positive polarity, which is immediately followed by a pulse of negative polarity, as shown in Fig. 10*c*. When the pulse-widener 148 is in its position of rest, a pulse of positive polarity is ineffective, but the next following pulse of negative polarity causes the pulse-widener 148 to be triggered and the anode circuit of the first pentode system has produced across it a widened pulse of positive polarity, such for example as shown in Fig. 10*d* at the instant $t_8$. If at the instant of the occurrence of a pulse of Fig. 10*b* the pulse-widener 148 were not in the position of rest, the first pentode system being consequently cut off and the second being conductive, the pulse of positive polarity obtained from the differentiating network brings about, as illustrated for example in Figs. 10*b* and 10*c*, at the instant $t_9$, flopping back of the pulse-widener 148 into its position of rest and the next following pulse of negative polarity causes the pulse-widener to respond again. Thus, the output circuit of the pulse-widener 148 has produced across it two immediately successive, widened pulses which, owing to their extremely small time interval, may be looked upon as a single pulse of a duration corresponding to twice the period of the recurrence frequency of the equidistant pulses locally produced.

The pulses of Fig. 10*d* obtained from the pulse-widener 148 are fed through a coupling condenser 154, a conductor 155 and a series resistance 156 to an integration condenser 158, shunted by a leak resistance 157, of a signal frequency-integrating network 159. Provided that the time constant of the integrating network is approximately one period of the lowest signal frequency to be transmitted, the integration condenser 158 has produced across it a triangular voltage which is shown in Fig. 10*e* and from which the signal voltage, also shown in Fig. 10*e*, may be derived by smoothing. The alternating voltage occurring across the integration condenser 158 is fed through a coupling condenser 160 to a low-frequency amplifier 161 and a loudspeaker 162 connected to the latter.

In the receiver shown in Fig. 9 a smoothing filter for the alternating voltage taken from the integration condenser is not used; such a smoothing filter may be dispensed with if the lowest pulse-recurrence-frequency occurring in the approximation signal exceeds the audible frequencies, or else if the loudspeaker system is not capable of following these high frequencies.

Figure 11:
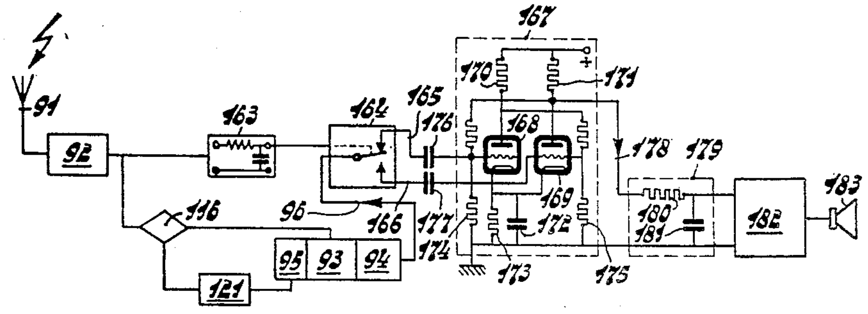

Fig. 11 shows a modified form of a receiver as shown in Fig. 9, in which a triangular approximation voltage of the transmitted signal is produced.

As in the receiver shown in Fig. 9, in the receiver of Fig. 11 the signals captured by an aerial 91 are fed to a high frequency amplifier and detector 92 and provision is made of a local pulse generator 93—95 and its AFC-circuit 116—121.

For the purpose of deriving gating pulses from signal pulses obtained upon detection, these pulses are conveyed through a smoothing filter 163, the cut-off frequency of which approximately equals the pulse-recurrence-frequency of the locally produced, equidistant pulses. The gating pulses thus obtained by widening the signal pulses control a coincidence mixing stage 164, which acts as a switch having an alternating contact and to which the locally produced equidistant pulses are fed through a conductor 96. A preferred form of such a circuit-arrangement is described more fully with reference to Fig. 12. In accordance with the presence or absence of gating pulses obtained from the smoothing filter 163 the locally produced equidistant pulses occur across the output conductor 165 or 166 of the coincidence mixing stage 164 and are fed to a pulse-widener 167.

This pulse-widener comprises two galvanically, crosswise coupled triodes 168, 169, anode resistances 170, 171 and a common cathode resistance 173 shunted by a condenser 172, with the result that the control-grids of the crosswise coupled triodes, earthed through grid resistances 174, 175 have produced across them a suitable negative grid bias voltage.

Such circuit-arrangements comprising two triodes coupled crosswise in a galvanic manner are known per se and exhibit the feature of exhibiting only two stable states of equilibrium that is to say the triode 168 may be conductive and the triode 169 cut off or else triode 168 is cut off and triode 169 is conductive. If starting with the condition in which triode 168 is conductive and triode 169 cut off, the control-grid of the first triode 168 has fed to it a pulse of negative polarity, this results in cutting-off of the first triode 168 and thus in rendering the triode 169 conductive or in other words tripping over of the circuit. If the second triode 169 is conductive and a pulse of negative polarity is fed to its control-grid, the circuit trips back to its initial condition, in which the first triode 168 is conductive and the second triode 169 is cut off.

The circuit-arrangement described above is controlled by locally produced, equidistant pulses of negative polarity obtained from a coincidence mixing stage 164. The two output leads 165 and 166 are connected respectively, through coupling condensers 176 and 177, to the control-grids of the triodes 168 and 169 respectively. Each time a transmitted pulse is received, the alternate contact switch is turned downwards and a locally produced pulse out of the sequence of equidistant pulses with negative polarity is fed to the control-grid of the second triode 169 with the result that this triode is cut off. The anode of this triode has then set up at it a high positive voltage which is fed through a conductor 178 to a signal-frequencies integrating network 179, which network comprises a series resistance 180 and an integration condenser 181, with the result that the voltage across the integration condenser is increased. This condition is maintained until, owing to the absence of a signal pulse and the gating pulse derived therefrom, the switch is turned upwards in the coincidence mixing stage, with the result that the triode 168 conductive until then is cut off by reception of a locally produced pulse and the triode 169 becomes conductive. The voltage at the anode of the triode 169 is then decreased and a decrease of the voltage across the integration condenser 181 of the signal-frequencies integrating network 179 occurs.

The signal-frequencies integrating network 179 has thus fed to it widened signal pulses which correspond essentially with the pulses shown in Fig. 10*b*, there being, however, no interruption between two immediately successive pulses. The voltage across the integration-condenser 181 may, consequently, again be represented by the triangular approximation curve of Fig. 10*e*, from which, by smoothing, the transmitted signal, which is also shown in Fig. 10*a*, may be derived; this signal may be fed through an amplifier 182 to a loudspeaker 183 (cf. Fig. 11).

Figure 12:
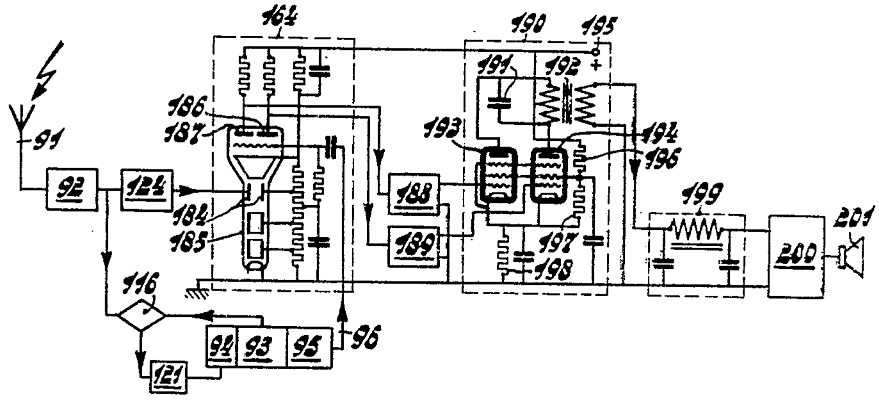
Fig. 12 represents a receiver yielding a rectangularly varying approximation curve of the incoming signals, as will be explained with reference to the diagrams shown in Figs. 13*a* to *e*.

Fig. 12 shows a further form of a receiver for deltapulse-code-modulation in which a rectangularly-varying approximation curve of the transmitted signal occurs.

Figures 13A, 13B, 13C, 13D, 13E:
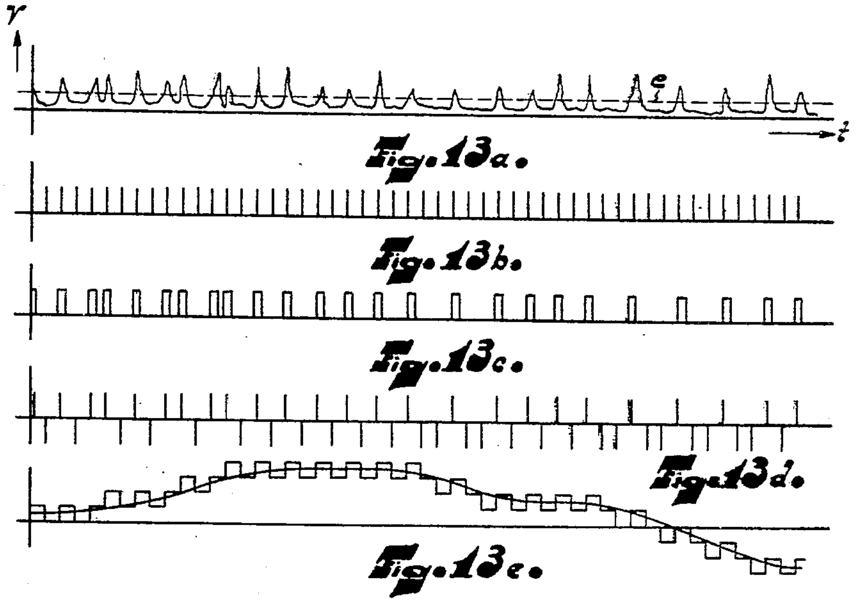

The pulsatory signals received by an aerial 91 are, as before, supplied to a high-frequency rectifier and detector 92. The pulses derived from the output circuit of detector 92 are shown in Fig. 13*a* and correspond to the pulses of positive polarity transmitted by the transmitter in Fig. 5 and shown in Fig. 6*b*. As before, the receiver comprises a pulse generator 93—95 having an output conductor 96, an AFC-mixing stage 116, a low-pass filter 121 for the AFC-control voltage and a gating pulse generator 124, which is triggered by the incoming pulses. Furthermore provision is made of a coincidence mixing stage 164 of the kind indicated by 164 in Fig. 11, to which the locally produced equidistant pulses are supplied through conductor 96 together with the gating pulses supplied by the gating pulse generator 124.

The coincidence mixing stage 164 serves as a switch with changing contact in a similar manner as the switching device 2 provided in the transmitter of Figure 5, to which hence is referred. Only the adjustment of the voltage set up at the deflection plates 184 of the tube 185 is so chosen that, in the absence of gating pulses supplied to either of the deflection plates, the electron beam is directed towards, for example, the electrode 186 having the capacity of emitting secondary electrons and, in the presence of gating pulses, towards the second electrode 187 having also the capacity of emitting secondary electrons. Thus, the equidistant pulses supplied by the pulse generator 93—95 and shown in Fig. 13*b* will be transmitted to the electrode 187 or 186 as a function of the presence or absence of the gating pulses shown in Fig. 13*c* and will excite pulse regenerators 188 and 189 respectively which regenerators supply pulses of similar polarity which, for the sake of clearness are shown as pulses of opposite polarity in Fig. 13*d*. The pulses of Fig. 13*d* are supplied to a device 190 by means of a signal-frequencies integrating network and comprising an integration-condenser 191, which is shunted by the primary winding of a transformer 192. The integration-condenser 191 with the primary winding of transformer 192 in parallel thereto is connected between the anodes of two pentodes 193, 194, which are arranged in push-pull, the anodes being connected via a centre tapping on the primary winding to the positive terminal 195 of a source of anode supply. The anode circuit of the tubes 193, 194 connected in push-pull is tuned to a frequency which is lower than the lowest signal frequency to be transmitted. The tubes 193, 194 are, as a rule, cut-off by means of a negative grid-bias derived from a voltage divider comprising resistances 196, 197 and a cathode resistance 198 which is shunted capacitively. The positive pulses derived from the pulse regenerator 188 release the pentode 193, whereas the pentode 194 is released by the pulses derived from the pulse regenerator 189. The voltage set up at the integration-condenser 191 increases or decreases according as the one or the other of the push-pull connected pentodes is released, so that the rectangular approximation of the transmitted signal shown in Fig. 13*e* is produced at the said condenser. The alternating voltage at the integration-condenser 191 is derived from the secondary winding of the output transformer 192 and supplied to an amplifier 200 and a loudspeaker 201, connected thereto, by way of a low-pass filter 199, for the purpose of suppressing pulse recurring frequencies. After pulse recurring frequencies have been removed from the approximation curve shown in Fig. 13*e*, the signal voltage results, which is also shown in Fig. 13*e*.

In the receivers discussed hereinbefore use is invariably made of the same AFC-circuit for readjusting the frequencies of the equidistant pulses locally produced. However, use may alternatively be made of other AFC-circuits of types known per se, provided that they supply an AFC-voltage the value of which is dependent on the phase relation between the incoming pulses and the pulses locally produced.

In a multiplex time-distribution system of transmission of a plurality of signals by means of deltapulse-code-modulation use may be made at the receiving end, similarly as in a transmitter designed for this purpose, of a local pulse generator which is common to a plurality of receiving channels, the pulse-recurring-frequency being increased in proportion with the number of the channels. In this case automatic frequency correction of the local pulse generator may take place on basis of incoming pulses belonging to different communication channels.

Furthermore it has been assumed that the incoming pulses are substituted by adjacent pulses from a series of equidistant pulses locally produced, with or without addition of the missing pulses to the series of incoming pulses. However, it is also possible in the receiver to supply the missing pulses instead of the incoming pulses to a signal-frequencies integrating network with suppression of the incoming pulses, since, as has already been discussed in connection with the transmitter shown in Fig. 5, in the case of a series of equidistant pulses of changing polarity (cf. Figs. 6b and 13d) the positive or the negative pulses may be used for reproducing the transmitted signal. The incoming signal may thus be reproduced in that either the positive or the negative pulses shown in Fig. 13d are supplied either directly to a signal-frequencies integrating network (cf. 141 in Fig. 7) or by way of a pulse-widener as shown in Fig. 9 or 11.

In the discussion of the transmitters shown in Figs. 1, 4 and 5, we started from substantially the same signal voltage, the pulses transmitted being shown in Figs. 2b, 3c and 6b. A comparison of the series of pulses transmitted in accordance with the said figures shows that these pulse series are different from one another, which might readily lead to the conclusion that the pulses transmitted, for example, by a transmitter as shown in Fig. 1, in which a sawtooth shaped approximation curve of the signal voltage to be transmitted occurs, could not be received with a receiver of the type shown in Figs. 9, 11 and 12 respectively, in which a triangularly and rectangularly shaped approximation curve of the transmitted signal occurs. The differences between the series of pulses transmitted in accordance with Figs. 2b, 3c and 6b are, however, solely due to different amplitude ratios in the auxiliary receivers used in the transmitters. The transmitted series of pulses are wholly identical with a suitable construction of the auxiliary receivers used in the transmitters.

Each of the Figs. 14a, b, c shows the signal voltage produced in the types of transmitters of Figs. 1, 4 and 5 respectively and the associated approximation voltages derived from the different auxiliary receivers which approximation voltage is sawtooth shaped in Fig. 14a, triangular in Fig. 14b and rectangular in Fig. 14c.

The difference between the various approximation curves is a function of a frequency corresponding to the pulse recurring frequency. Practically identical voltages remain upon removal of the pulse recurring frequency (for example by smoothing).

As before, pulses produced at equidistant moments are transmitted or suppressed in accordance with the polarity of the difference voltage between the signal and comparison voltages. As shown in Fig. 14d, in which the transmitted pulses are indicated in full lines and the pulses of opposite polarity which are suppressed at negative polarity of the difference voltage are indicated in dotted lines, identical series of pulses now occur in all types of transmitters. This series of pulses varies, however, if in a transmitter operating as illustrated in Fig. 14a, whenever a transmitted pulse occurs, the output voltage of the auxiliary receiver varies by a finite value other than that shown in the figure. However, when use is made of a receiver adapted for the pulses now transmitted, in which an approximation, for example triangular, of the transmitted signal occurs, there is no additional distortion of the transmitted signal, but only a proportional increase or decrease of the amplitude of the approximation signal set up at the integration-condenser.

If in a receiver of the type shown in Figs. 7, 9 or 11, the series of negative pulses shown in dotted lines in Fig. 14d instead of the series of positive pulses are supplied to the signal-frequencies integrating network an approximation curve of the transmitted signal is likewise obtained. If in a receiver of the type shown in Fig. 12, having rectangular approximation of the signal voltage the polarity of both the negative and positive pulses is inverted, the signal to be reproduced is inverted in polarity, but without a distortion brought about by the inversion of polarity. Here it may again be mentioned that the pulse-recurring frequency used in the system according to the invention advantageously is chosen to be considerably higher (at least 5 times higher) than the highest signal frequency to be transmitted. A comparison of the approximation curves of Figs. 2a and 3a with that of Fig. 6a shows that the approximation between the moments $t_4$ and $t_5$ and between the moments $t_6$ and $t_7$ is more exact in Fig. 6a as a result of the higher pulse-recurring frequency chosen in this figure.

Fig. 15 shows a relay transmitter for use in a system according to the invention, for example a multiplex time-distribution system, in which the relayed pulses are time-corrected. The signals received by a directional aerial 202 are supplied to a high-frequency amplifier and detector 203 and subsequently supplied on the one hand, to a gating pulse generator 204 and, on the other hand, to an AFC-mixing stage 205. As the receivers shown in Figs. 7, 9, 11 and 12, the device comprises a pulse generator for generating equidistant pulses and an oscillator 206, a pulse shaper 207 and a frequency corrector 208, an AFC-voltage derived from the AFC-mixing stage 205 being supplied, by way of a low-pass filter 209, to the frequency corrector 208. As before, the gating pulses derived from the gating pulse generator 204 are supplied, together with the equidistant pulses locally produced, to a coincidence mixing stage 210, which may be similarly designed as the coincidence mixing stages discussed in connection with the receivers. The pulses derived from the output circuit of the coincidence mixing stage 210 are supplied, via a pulse regenerator 211, to a modulator 213 coupled to a carrier-wave oscillator 212, whereupon the resulting modulated carrier-wave oscillations are transmitted by means of a directional aerial 214.

The relay transmitter shown in Fig. 15 may be constructed in such manner that each incoming pulse results in the transmission of an adjacent pulse from the series of equidistant pulses locally produced. However, it is alternatively possible, for example with the use of a coincidence mixing stage as indicated by 164 in Fig. 11 or 12, to transmit the pulses which are missing in the series of incoming pulses instead of the corrected incoming pulses.

In the foregoing we discussed forms of construction for deltapulse-code-modulation in which the position of the pulses received by a main receiver may be corrected. However, it is alternatively possible, within the scope of the invention, to utilise transmitters in which the starting point is not formed by a series of equidistant pulses.

In the last-mentioned case and with deltapulse-code-modulation use may be made, for example, of a pulse generator which is triggered, whenever the difference voltage derived from the difference producer of the signal voltage to be transmitted and the output voltage of an auxiliary receiver exceeds a given threshold value. In this case the active difference voltage is constituted by the voltage derived from the difference producer, decreased by the threshold voltage. In this case also an approximation signal of sawtooth, triangular or rectangular shape may be produced in the output circuit of the auxiliary receiver and hence also in the output circuit of a main receiver, which approximation voltage comprises, however, a direct-current component of constant value corresponding to the threshold value. If in such a transmitter the transmitted pulses are not derived from a series of equidistant pulses, it is not possible at the receiving end to eliminate time-displacements of the incoming pulses, so that a certain noise occurs in the incoming signal; in addition, the bandwidth required for the transmission of signals is greater.

In the transmitters and receivers described in the foregoing it has been taken for granted that the variation in the output voltage of the receiver brought about by a pulse in the main or auxiliary receiver was independent of the value of the difference voltage and the signal voltage. However, it is possible to construct the transmitter in such manner that it is made known to the receivers whether the difference voltage is higher or lower than a determined threshold value. For example, the amplitude of the transmitted pulses may have two different values which are greatly different and at which pulses of small amplitude are transmitted as long as the differential voltage remains below the said threshold value, whereas pulses of great amplitude are transmitted as soon as the differential voltage exceeds the said threshold voltage. Furthermore, it is possible for the variation in input voltage produced in the receivers to be made dependent, in the reception of pulses, upon the instantaneous value of the voltage set up at the integration condenser.

If at the transmitting end use is made of a series of equidistant pulses, the possibilities of variation of devices according to the invention as mentioned in the preceding paragraph invariably permit of correcting the position of the incoming pulses at the receiving end for the purpose of suppressing noise otherwise produced thereby. In so far there need be no fear of noise produced by incoming pulses shifted in time, for example when use is made of wave conductors for short-distance transmission of the modulated carrier waves, the means required for correcting the position of the incoming pulse may be omitted from the receivers.

The transmission of intelligence signals by way of pulse modulation can still be greatly improved with the use of suitable means in the aforesaid systems comprising transmitters and receivers of the type referred to hereinbefore.

In a system or transmitter for transmitting intelligence signals by way of pulse modulation of the aforesaid type the said means for improving the transmission consist in that the intelligence signals to be transmitted are fed to the difference producer through a compression network, more particularly a compression amplifier, with a transmission factor or amplification factor decreasing preferably exponentially with an increase in instantaneous value of the intelligence signal.

With the use of a compression amplifier at the transmitter side an expansion network, particularly an expansion amplifier, must be connected in the main receiver to be used, with which the incoming pulses are fed to a load through a signal-frequencies integrating network, between the signal-frequencies integrating network and the load, of which expansion network the transmission factor or the amplification factor increases preferably exponentially with an increase in instantaneous value of the intelligence signal.

Experiments have revealed that with the use of signal compression at the transmitter side the transmission quality is greatly improved with unchanged maximum recurrence frequency of the transmitted pulse-shaped signals. Conversely, with unchanged transmission quality, the maximum recurrence frequency of the transmitted pulse-shaped signals can be reduced in comparison with that without the use of compression and expansion.

This will be explained with reference to Figs. 16 and 17 which represent a transmitter and a receiver respectively for the improved transmission (improved according to the present patent application) of signals reproduced by way of deltapulse-code-modulation.

With the transmitter shown in Fig. 16 the voice oscillations from a microphone 215 are supplied to a compression amplifier 216, of which the transmission factor or amplification factor represented by a curve indicating the relation existing between input voltage and output voltage, decreases preferably exponentially with an increase in instantaneous value of the voice oscillations to be amplified. The voice oscillations from the compression amplifier are fed to a difference producer 217, to which is at the same time applied the output voltage of an auxiliary receiver 218 associated with the transmitter. The difference voltage from the difference producer controls a switching device 219 which passes or suppresses equidistant pulses from a pulse generator 220 in accordance with the polarity of the difference voltage. The pulses from the switch device 219 control a pulse regenerator 221, whereupon the repeated pulses are fed on the one hand to a transmitter-modulator 222 with a carrier-wave oscillator 223 connected thereto and a transmission aerial 224, and on the other hand to the input circuit of the auxiliary receiver 218. The latter comprises a signal-frequencies integrating network and, if required, amplifiers, the output circuit of the auxiliary receiver being such as to produce a sawtooth, triangular or rectangular approximation curve winding round the intelligence signal fed to the difference producer 217.

Fig. 17 shows a main receiver for use in the transmitter shown in Fig. 16.

The pulse-shaped signals picked up by an aerial 225 are fed to a detector 226, if desired after high-frequency and medium-frequency amplification. The detected pulses are passed on the one hand to a pulse widener 227 and on the other hand utilized for synchronising a generator 228 producing equidistant pulses with a recurrence frequency corresponding to the maximum recurrence frequency of the detected pulses.

The widened pulses from the pulse widener 227 and the pulses produced by the pulse generator 228 control a coincidence mixer stage 229 by which only those pulses from the pulse generator 228 are passed which coincide with pulses from the pulse widener 227.

The incoming detected pulses may exhibit a considerable shift in time of occurrence due to transmission disturbances, but this is not the case with the pulses taken from the coincidence mixer stage 229 and corresponding to the incoming pulses. The pulses from the coincidence mixer stage are further treated in the receiver as if they were incoming pulses. Therefore, they will be termed substitution pulses.

The substitution pulses control a pulse widener 230, of which the output pulses, as has been explicitly set out in the principal patent application, are supplied to a signal-frequencies integrating network 231. The transmitted voice oscillations appear in the output circuit of the integrating network 231. Owing to compression used at the transmitter side, however, the said voice oscillations are fed through an expansion amplifier 232 to the load, for example a loudspeaker 233. The function of the expansion amplifier is to compensate the compression effected at the transmitter side and therefore has an amplification factor which increases exponentially with the instantaneous value of the signals supplied thereto. As is known per se such an expansion amplifier is obtained in a simple manner by providing a normal amplifier having an amplitude-independent amplification factor, with a negative feedback circuit, of which the transmission factor, that is to say the ratio between input and output voltage variations, decreases exponentially with an increase in instantaneous value of signals supplied thereto.

By the aforesaid improvement, the detrimental influence of the so-called coding noise is greatly reduced. In fact, this coding noise is normally a maximum with low signal amplitudes. In the present case, better approximation of signals of low amplitude is ensured at the receiver side at the expense of approximation of comparatively high signal-instantaneous values.

What we claim is:

1. In a delta pulse code modulation system for the transmission of intelligence signals varying in amplitude and frequency by radiating mutually identical pulses wherein the time spacing between consecutive pulses is indicative of said intelligence; the combination comprising a pulse generator for producing equidistant impulses, a regenerator responsive to triggering impulses for producing mutually identical pulses coincident in time with impulses from said generator, a voltage-gated electronic switching device whose input is coupled to said generator and whose output is coupled to said regenerator, said device, when gated by a control voltage, supplying impulses to said regenerator to produce said mutually identical pulses, means coupled to the output of said regenerator and including an integrating network for yielding an integrated voltage which varies by a finite amount whenever a pulse is received from said regenerator, a difference producer, means to supply both said integrated voltage and said intelligence signals as an input to said difference producer to develop in the output thereof a control voltage depending on the difference therebetween, and means coupled to the output of said difference producer to apply said control voltage to said device to gate said device as a function thereof.

2. The combination, as set forth in claim 1, wherein said difference producer includes a transformer having first and second primary windings and a secondary winding, and wherein said integrated voltage and said intelligence signals are respectively supplied to said first and second primary windings, the difference voltage being produced across said secondary winding.

3. The combination, as set forth in claim 1, wherein said difference producer includes a resistance network having first and second input resistances and an output resistance and wherein said integrated voltage and said intelligence signals are respectively supplied to said first and second input resistances, the difference voltage being produced across said output resistance.

4. The combination, as set forth in claim 1, wherein said difference producer includes first and second amplifying tubes respectively amplifying said integrated voltage and said intelligence signals, said tubes having a common output circuit in which said difference voltage is produced.

5. The combination, as set forth in claim 1, further including a compression amplifier having a compression characteristic at which the amplification of said amplifier decreases with increasing input signals, and means to supply said intelligence signals to said difference producer through said amplifier.

6. In a delta pulse code modulation system for the transmission of intelligence signals varying in amplitude and frequency by radiating mutually identical pulses wherein the time spacing between consecutive pulses is indicative of said intelligence; the combination comprising a pulse generator for producing equidistant impulses whose recurrence rate is greater than the maximum frequency of said intelligence signals, a regenerator responsive to triggering impulses for producing mutually identical pulses coincident in time with said impulses, a voltage-gated electronic switching device whose input is coupled to said generator and whose output is coupled to said regenerator, said device when gated by a control voltage supplying impulses to said regenerator to produce said mutually identical pulses, an auxiliary receiver coupled to the output of said regenerator and including an integrating network yielding an integrated voltage which varies by a finite amount when a pulse is received from said regenerator, a difference producer, means to supply both said integrated voltage from said auxiliary receiver and said intelligence signals as an input to said difference producer to develop in the output thereof a control voltage having a predetermined polarity when the amplitude of said integrated voltage exceeds that of said intelligence signals and having the reverse polarity when the amplitude of said intelligence signals exceeds that of said integrated voltage, means coupled to the output of said difference producer to apply said control voltage to said device to gate same accordingly, and means coupled to the output of said regenerator to transmit said mutually identical pulses.

7. The combination, as set forth in claim 6, wherein said switching device includes a normally non-conductive electron discharge amplifying tube having first and second grids, and means to supply said difference voltage and said equidistant impulses to respective grids of said tube, said tube being rendered conductive only when said difference voltage has a particular polarity.

8. The combination, as set forth in claim 6, wherein said auxiliary receiver further includes a rectifier, said rectifier being interposed in serial connection between said regenerator and said network.

9. The combination, as set forth in claim 6, wherein said receiver further includes a pulse widening stage interposed in serial connection between said regenerator and said network.

10. The combination, as set forth in claim 6, wherein said network has a charging time which is substantially equal to the discharging time thereof.

11. The combination, as set forth in claim 6, wherein said network has a charging time which is substantially less than the discharging time thereof.

12. In a delta pulse code modulation system for the transmission of intelligence signals varying in amplitude and frequency by radiating mutually identical pulses wherein the time spacing between consecutive pulses is indicative of said intelligence; the combination comprising a pulse generator for producing equidistant impulses, first and second regenerators each responsive to triggering pulses for producing mutually identical pulses coincident in time with said impulses, a voltage-gated electronic switching device coupled to said generator and having first and second output circuits coupled to said first and second regenerators respectively, a combining amplifier coupled to the first and second outputs of said device to produce a combined pulse voltage, an integrating network coupled to the output of said amplifier to produce an integrated voltage which varies by a finite amount when a pulse is received from said amplifier, a difference producer, means to apply both said integrated voltage and said intelligence signals as an input to said producer to develop in the output thereof a control voltage having a given polarity when the amplitude of said integrated voltage exceeds that of said intelligence signals and having the reverse polarity when the amplitude of said intelligence signals exceeds that of said integrated voltage, means to apply said control voltage to said device to gate same to produce a triggering impulse coincident with a generated impulse in said first output circuit when said control voltage has said given polarity and to produce a triggering impulse in said second output circuit coincident with a generated impulse when said control voltage is of the reverse polarity, and means to transmit the mutually identical pulses produced by one of said regenerators.

13. The combination, as set forth in claim 12, wherein said switching device includes a switching tube having an anode, first and second secondary emission electrodes, deflection electrodes and means for generating an electron beam, said first and second secondary electrodes being respectively coupled to said first and second output circuits, means to supply said anode and said deflection electrodes respectively with said periodic pulses and said difference signals, the deflection electrodes directing said electron beam upon either one of said secondary emission electrodes in accordance with the polarity of said difference signals.

JAN FREDERIK SCHOUTEN.
FRANK DE JAGER.
JOHANNES ANTON GREEFKES.

References Cited in the file of this patent

UNITED STATES PATENTS

| Number | Name | Date |
|---|---|---|
| 2,013,671 | Roe | Sept. 10, 1935 |
| 2,114,255 | Powell | Apr. 12, 1938 |
| 2,139,655 | Allensworth | Dec. 13, 1938 |
| 2,207,744 | Larson | July 16, 1940 |
| 2,464,607 | Pierce | Mar. 15, 1949 |
| 2,505,029 | Carbrey | Apr. 25, 1950 |
| 2,510,054 | Alexander et al. | June 6, 1950 |
| 2,514,671 | Rack | July 11, 1950 |
| 2,516,587 | Peterson | July 25, 1950 |
| 2,520,125 | Clavier | Aug. 29, 1950 |